& Granger

United States Patent [19]

Wilkes

[11] Patent Number: 5,072,851
[45] Date of Patent: Dec. 17, 1991

[54] DYNAMIC PRESSURE RELIEF SEAL FOR PRESSURE VESSELS

[75] Inventor: Robert D. Wilkes, Sanford, N.C.

[73] Assignee: Essef Corporation, Shaker Heights, Ohio

[21] Appl. No.: 527,269

[22] Filed: May 23, 1990

[51] Int. Cl.⁵ .............................................. B65D 51/16
[52] U.S. Cl. .................................... 220/366; 220/4.21; 220/204; 220/208; 220/209; 220/320; 220/681; 220/684; 220/686
[58] Field of Search .................... 220/366, 565, 4.21, 220/4.24, 4.25, 203, 208, 209, 316, 320, 89.1, 684, 686, 204, 240, 681

[56] References Cited

U.S. PATENT DOCUMENTS

| | | | |
|---|---|---|---|
| 4,133,422 | 1/1979 | Wiltshire et al. | 220/5 R |
| 4,219,125 | 8/1980 | Wiltshire et al. | 220/5 A |
| 4,267,940 | 5/1981 | Wade | 220/321 |
| 4,276,990 | 7/1981 | Chiodo | 220/209 |
| 4,556,150 | 12/1985 | Ikumi | 220/4.21 |
| 4,750,610 | 6/1988 | Ryder | 206/5.1 |
| 4,996,027 | 2/1991 | Kanner | 422/113 |
| 5,004,129 | 4/1991 | Loch et al. | 220/366 |

Primary Examiner—Stephen Marcus
Assistant Examiner—Stephen Cronin
Attorney, Agent, or Firm—Pearne, Gordon, McCoy & Granger

[57] ABSTRACT

A pressure relief seal for pressure tanks having separable tank sections is disclosed. The seal is formed by an O-ring within an O-ring cavity, in turn formed by each tank section. Overpressurization or improper assembly of the tank sections causes the O-ring to be displaced from its sealing position to permit fluid in the tank to flow past the O-ring and through pressure relief channels at the seal.

6 Claims, 3 Drawing Sheets

DYNAMIC PRESSURE RELIEF SEAL FOR PRESSURE VESSELS

BACKGROUND OF THE INVENTION

This invention relates to pressure vessels and, more particularly, to a seal arrangement between separable container sections which is adapted to relieve pressure if the container sections are improperly assembled or if the operating pressure of the vessel is exceeded.

Pressure vessels which are employed as swimming pool filters generally may be categorized as separable and non-separable. Non-separable pressure vessels contain a filter medium such as sand, which may be cleaned by backwashing techniques to condition the medium for further filtering operations. Access to the interior of the pressure vessel is not necessary, since the medium and even the filter laterals may be removed through a relatively small access opening.

Separable pressure vessels are needed for filtering techniques that require internal access for manufacturing and service maintenance throughout the life of the filter. Filtering arrangements in this category are diatomaceous earth, cartridge, and stacked disc filter arrangements.

Historically, the design of a separable tank has endeavored to follow the same design principles as a non-separable tank without distinction. This involves designing with conservative safety factors for strength and a requirement for leak integrity that is comfortably above the design working pressure. This is to ensure that the product is reasonably safe to use over extended time and exposure to environmental conditions. In defining tank seals, therefore, the tendency has been to make the seal fail-safe to such a degree that the seal maintains its integrity up to the structural limits of the tank side wall or the mechanical clamp holding the sections together. The conservative design of such tanks assumes that the tank will be correctly operated and assembled according to its design specifications. Frequently, however, the end user of the tank will ignore the manufacturer's assembly instructions and operating requirements, resulting in hazardous conditions. Thus, if the tank is improperly assembled after filter maintenance or replacement, the seal will maintain a leakproof condition, while the improperly assembled clamping band will be stressed beyond its mechanical capabilities even under normal operating pressure conditions. On the other hand, if the tank is properly reassembled and the user subjects the tank to abnormally high internal pressures by, for example, connecting the tank directly to city water pressures, the seal may maintain its integrity up to the burst pressure of the pressure vessel. These conditions are exacerbated if air is trapped in the vessel.

Conventional and logical approaches to relieving excess internal tank pressure by providing pressure relief valves to not solve the problem, since pressure relief valves are not adequately sized to handle the tremendous volume of fluid required to return overpressurized tanks to a safe condition, particularly if air is trapped in the tank. Moreover, excess operating pressures may not be encountered if the mechanical clamping band is improperly installed, thus creating a condition where normal operating pressures may place undue stress on the band.

The hazard posed by the separable pressure vessel is particularly dangerous in that it may occur without warning. If a separable tank is improperly assembled or overpressurized, the container sections may separate violently or rupture violently, respectively.

SUMMARY OF THE INVENTION

This invention overcomes the foregoing problems by providing a sealing arrangement for a separable tank which acts as a dynamic seal in which movement of the seal is related to the internal pressure of the vessel. The seal geometry and subsequent movement of the seal are designed so that the vessel leaks at a predetermined pressure if the vessel is properly assembled or leaks at any elevated pressure if the vessel is improperly assembled. By designing the seal so that its leak pressure is slightly beyond its working pressure, e.g., 20% beyond its working pressure, no large overpressure can be sustained and the vessel cannot rupture, since its inherent strength is much larger than the predetermined leakage pressure. If the vessel is improperly assembled, any internal pressure which would cause the sealing member to seek a new sealing surface would be immediately relieved and the tank would leak.

In general, these objectives are attained by employing the sealing mechanism itself as a pressure relief valve to exhaust large amounts of fluid if the predetermined leak pressure is exceeded or to prohibit the formation of a seal if the container sections are improperly assembled. A desirable aspect of the former situation is that the seal will be returned to its sealing position as the tank pressure is reduced to its proper operating pressure, but will continue a leakage cycle until the tank is properly operated at a correct pressure. In the latter situation, the tank will continue to leak until the container sections are properly assembled. In both cases, tank leakage will signal that an anomalous condition exists without tank rupture or separation.

According to one aspect of this invention, the elastic deformation of the pressure vessel itself varies the pressure holding integrity of an O-ring. The material of the vessel and its geometry thus determine the pressure at which leakage occurs. If the vessel deformation and stress corresponding to the leakage pressure are within the elastic range of the vessel material, the vessel will not be damaged, and the vessel will reseal itself when the pressure is relieved.

More specifically, and according to this aspect of the invention, a pressure relief seal is provided for pressure tanks having separable container sections which are adapted to be assembled together to form a pressure chamber and to define a pressure retaining joint between the sections. The pressure retaining joint includes an O-ring cavity formed in part by each of the container sections. An O-ring is provided in the cavity so formed. The container sections are mechanically coupled by a clamping band which surrounds a flange on each container section so that the O-ring cavity exerts a static sealing pressure on the O-ring. In a properly assembled condition, the O-ring is adapted to withstand a pressure up to a predetermined internal pressure within the pressure chamber. If the predetermined internal operating pressure is exceeded, the O-ring cavity will be distorted within its elastic limit to thereby relieve the static sealing pressure on said O-ring and permit said O-ring to seek another sealing position. Pressure sealing at that position is prevented. However, by a plurality of passageways provided in the O-ring cavity which permit flow therethrough to the exterior of the pressure tank to thereby relieve excess pressure in the pressure chamber. Once the excess pressure is relieved, the O-ring cavity will return to its non-distorted condition and permit the O-ring to form a normal seal. If the cause of the abnormally high pressure within the pressure chamber is not corrected, the pressure tank will repeatedly cycle in the previously described manner so that the user will be apprised of an abnormal tank condition by observing leakage at the seal.

According to a further aspect of this invention, the O-ring cavity forms an external, circumferential flange on the tank which is clamped by a plurality of rigid C-shaped clamps. A compliant pad or spring is provided between a portion of the tank flange and the clamps so that excess internal pressure within the tank will cause the tank sections to tend to separate against the bias of the compliant pad and will open a tank parting plane normally sealed by the O-ring to such an extent that the O-ring will be blown out of its sealing position while the tank sections are still mechanically coupled by the clamps.

Alternatively, according to this embodiment, passageways may be formed in the O-ring cavity which will inhibit O-ring sealing when the tank section moves against the bias of the compliant pad.

If in either of these arrangements of the tank sections are improperly mechanically coupled, the O-ring will be unable to maintain a seal and the tank will leak rather than violently separate due to mechanical failure of the clamping device.

DETAILED DESCRIPTION OF THE INVENTION

Figure 1:
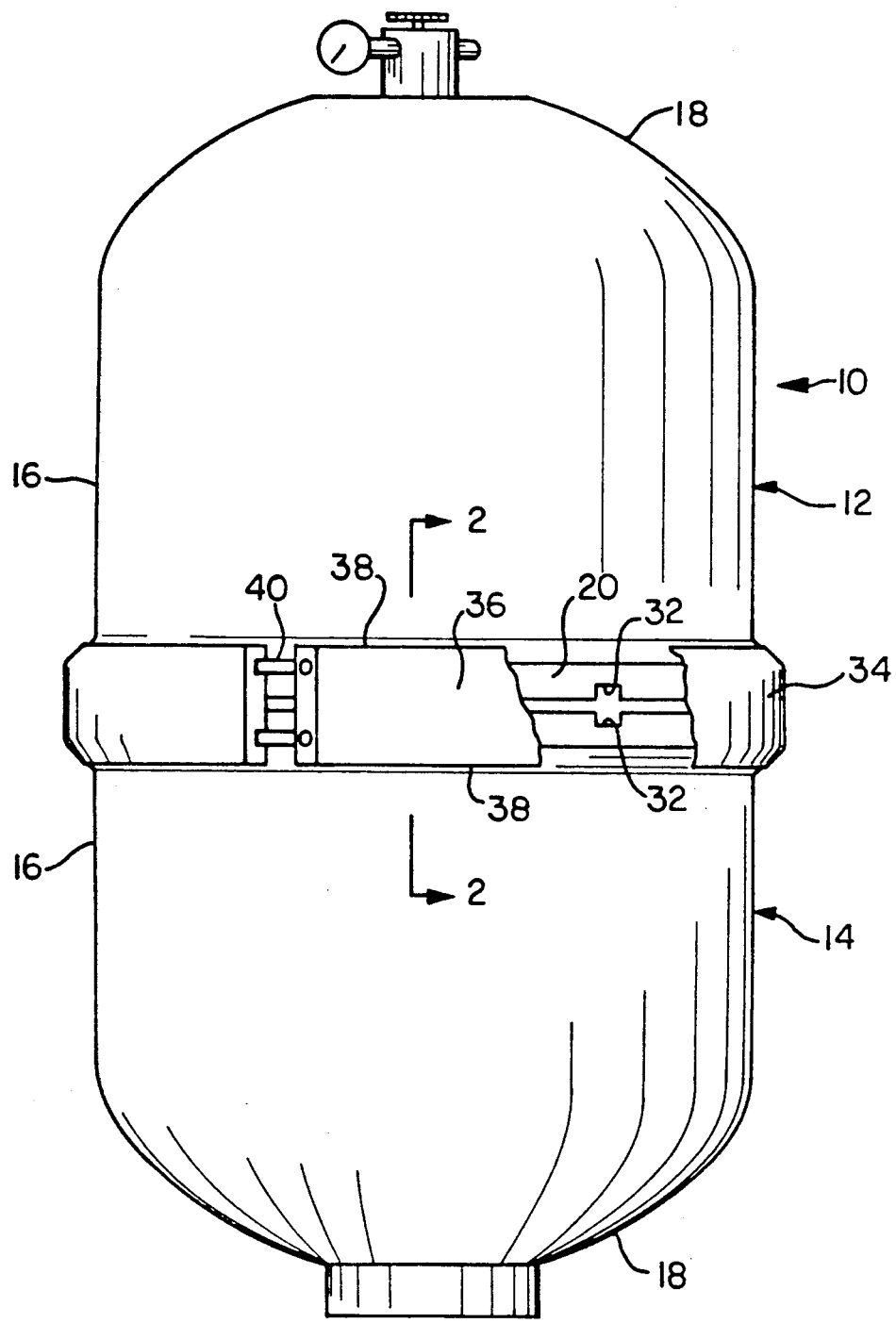
FIG. 1 is an elevational view of a pressure tank according to one aspect of this invention, with portions broken away for clarity.
Figure 2:
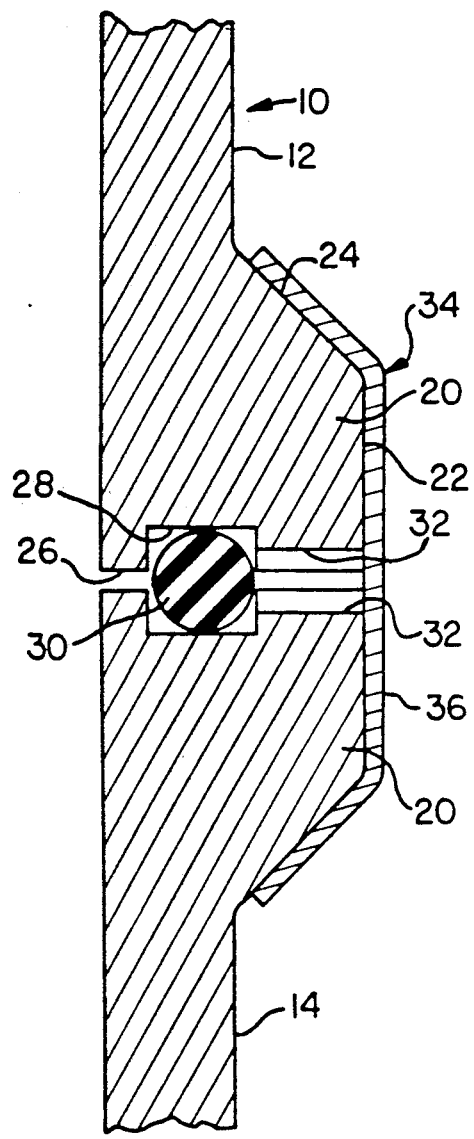
FIG. 2 is a fragmentary, cross-sectional view, the plane of the section being indicated by the line 2—2 of FIG. 1.
Figure 3:
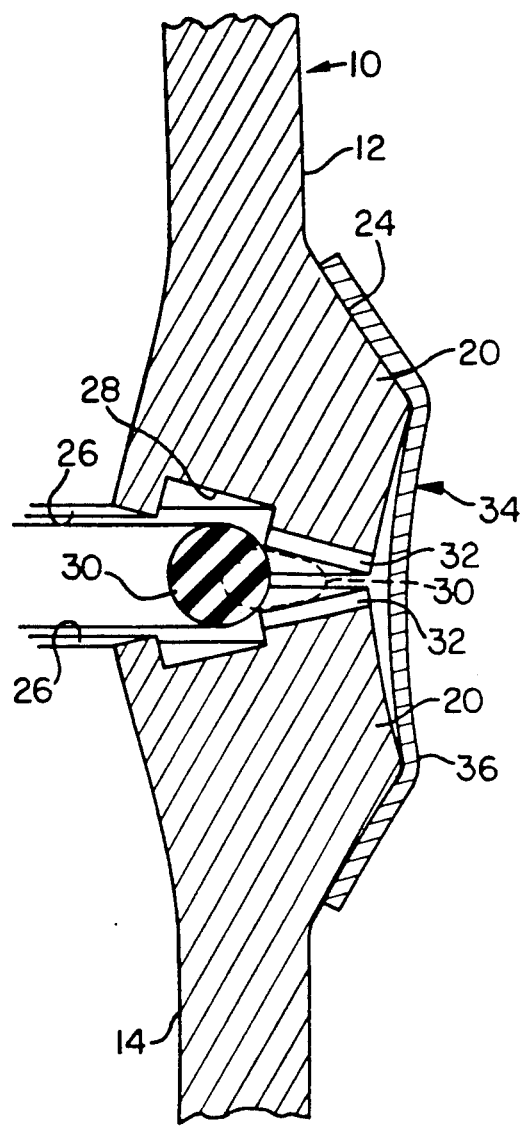
FIG. 3 is a fragmentary, cross-sectional view similar to FIG. 2, but showing the pressure seal in an exaggerated, deformed condition caused by excessive pressures.

Referring to the drawings, and particularly to FIGS. 1 through 3, there is illustrated a pressure tank 10 having upper and lower container sections 12 and 14, respectively. Each container section is cup-shaped, having a cylindrical wall portion 16 and oblate, ellipsoidal end sections 18. The illustrated pressure tank has particular utility as a tank which serves as a swimming pool filter, such as that described in U.S. Pat. No. 3,774,772.

Since it is necessary to permit access to the interior of the pressure tank for servicing the filter elements, it is necessary that the pressure tank be capable of being disassembled. Therefore, the container sections 12 and 14 are assembled together for disassembly and to define a pressure-retaining joint between the sections 12 and 14. The pressure-retaining joint is formed by identical portions of the container sections 12 and 14 at the open ends of the cylindrical portions 16, and includes an annular flange portion 20 defined by a cylindrical outer wall 22, an angularly related wall 24, and an end wall 26. An O-ring groove 28 is formed in each end wall 26 and an O-ring 30 is sealingly positioned in the O-ring grooves 28. For reasons which will hereinafter become apparent, a plurality of passage-defining notches 32 extend between the O-ring groove 28 and the cylindrical surface 22.

The separable container sections 12 and 14 are mechanically coupled by a clamping band 34, which is preferably fabricated from stainless steel and includes a cylindrical portion 36 which encircles the cylindrical portions 22 of the flange 20 and angularly related portions 38 which engage the angularly related portions 24. The clamping band 34 is tightened around the flange 20 by bolts 40 which are adjusted to a predetermined torque to apply sufficient pressure on the flange portions 20 to compress diametrically opposed portions of the O-ring for proper sealing of the pressure tank. A properly sealed condition of the pressure tank is illustrated in FIG. 2.

If the pressure tank should become overly pressurized, such as, for example, by connecting the tank inlet to city water pressure at, for example, 60 psi, the tank sections 12 and 14 will distort, as is shown in FIG. 3, to cause the pressure-retaining joint to assume the position illustrated therein. According to prior art practices, such distortion would not necessarily affect the efficiency of the seal, since the O-ring 30 would merely move and distort to the position illustrated in phantom outline in FIG. 3. This distortion may cause the tank sections to separate explosively. The provision of safety relief valves has been found to be an unacceptable solution, since large amounts of water must be exhausted to attain a safe operating pressure.

According to this invention, the O-ring is prevented from attaining an unacceptable secondary sealing position by providing outlet passageways from the interior of the tank which would prevent resealing of the O-ring. To this end, there is provided a plurality of passageways 32 between the interior of the tank and the exterior. When the tank is in a proper sealing condition as illustrated in FIG. 2, leakage cannot occur therethrough, since the O-ring is sealed at the bottom of the O-ring grooves 28. Upon distortion of the tank sections 12 and 14, as illustrated in FIG. 3, water will flow through the passageways 32 as soon as the O-ring is removed from its seats in the groove 28. The area and number of passageways 32 are selected so that the pressure built up in the tank may be quickly relieved to a safe operating pressure of, for example, less than 35 psi. When the pressure is relieved, the tank sections will return to the condition illustrated in FIG. 2, with the O-ring in its proper sealing position. As long as the improper pressurization of the tank exists, the tank will continue to cycle between the positions illustrated in FIGS. 2 and 3 to give a visual indication of an anomalous condition without separation of the tank sections.

Figure 4:
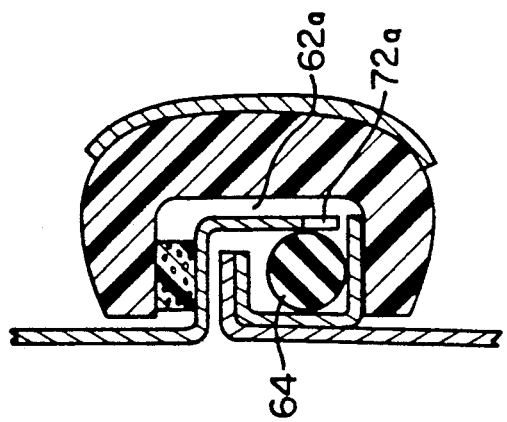
FIG. 4 is a cross-sectional view similar to FIG. 2, but showing one aspect of the invention employed as a seal for a metal tank.

Referring now to FIG. 4, there is illustrated a metal pressure tank having upper and lower tank sections 50 and 52. A pressure-retaining joint is formed between the sections by an arrangement which includes a circumferential channel member 54 welded to a portion of the lower tank section 52 and a radially extending lip 56. The mouth of the container section 50 forms a cup 58 which is defined by a radially extending flange 60 and a cylindrical portion 62. The cylindrical portion 62 serves to cover the channel 54 and provide a sealing surface for an O-ring 64.

The tank sections 50 and 52 are mechanically coupled by a plurality of rigid shoe clamps 66 which are held in position by a clamping band 68. As may be noted in FIG. 4, a compliant pad or cushion 70 is provided between the clamp 66 and the radially extending portion 60. The cushion 70 acts as a spring to absorb upward movement of the tank section 50 as the tank is pressurized. Overpressurization of the tank will compress the pad 70 to such a degree that the circumferential wall 62 will increase the gap 72 between the channel 54 and the cylindrical portion 62 to such a degree that the O-ring 64 will be blown through the gap, thus relieving the pressure in the tank in a safe manner. If the O-ring is blown out of the tank, the tank must be disassembled to properly reseat the O-ring.

The arrangement illustrated in FIG. 4 may be constructed so that it will cycle in the manner discussed with reference to the embodiment shown in FIGS. 1 through 3.

Figure 5:
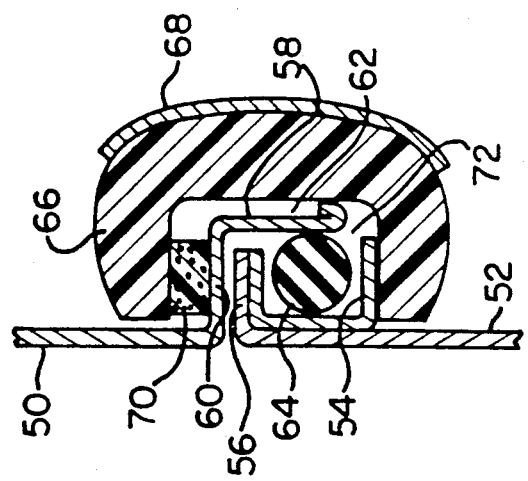
FIG. 5 is a cross-sectional view similar to FIG. 4 showing a further aspect of that embodiment.

The embodiment shown in FIG. 5 is similar to that shown in FIG. 4, and identical components have identical reference numerals. The pressure-retaining joint illustrated in FIG. 5, however, includes a cylindrical portion 62a having a plurality of notches 72a. Upon overpressurization of the pressure tank, the notches 72a will prevent the O-ring 64 from maintaining a seal so that water will flow through the notches 72a. The O-ring 64, however, is retained within the channel 54 by the cylindrical portion 62a so that the O-ring does not escape from the channel 54 and so that the seal will cycle between a proper sealing condition and a leaking condition, to give a visual indication of an improper seal.

Although the preferred embodiments of this invention have been shown and described, it should be understood that various modifications and rearrangements of the parts may be resorted to without departing from the scope of the invention as disclosed and claimed herein.

What is claimed is:

1. A pressure relief seal for pressure tanks having separable container sections adapted to be assembled together to form a pressure chamber and to define a pressure-retaining joint between said sections, said pressure-retaining joint including a seal-receiving cavity formed in part by each of said sections, sealing means in said cavity, means for retaining said sections and said sealing means in a predetermined sealing position up to a predetermined operating pressure, said joint and its seal-receiving cavity being displaceable from said predetermined sealing position when said predetermined operating pressure is exceeded, and passage means defining a flow path around said seal when said predetermined operating pressure is exceeded and when said sections are displaced from said predetermined sealing position. Said passage means comprising a plurality of notches in a wall forming said seal-receiving cavity.

2. A pressure relief seal for pressure tanks according to claim 1, wherein said sealing means is an O-ring.

3. A pressure relief seal for pressure tanks having separable container sections adapted to be assembled together to form a pressure chamber and to define a pressure-retaining joint between said sections, said pressure-retaining joint including an O-ring cavity formed in part by each of said container sections, an O-ring in said cavity, means for retaining said sections in a sealing position wherein said cavity exerts an O-ring sealing pressure on said O-ring up to a predetermined internal pressure within said chamber, said O-ring and said O-ring cavity being displaceable upon an increase in pressure beyond said predetermined pressure to remove sealing pressure on said O-ring, and a plurality of notches in said O-ring cavity defining pressure relief flow paths from said chamber and around said O-ring when said predetermined pressure is exceeded, said retaining means being responsive to a decrease of pressure to about said predetermined pressure to re-establish said seal.

4. A pressure release seal for pressure tanks having separable container sections adapted to be assembled together to form a pressure chamber and to define a pressure-retaining joint between said sections, said pressure-retaining joint being formed by opposed flange portions of said container sections and each flange section including an O-ring receiving cavity, an O-ring in said cavity, means for retaining said sections and said O-ring in a predetermined sealing position up to a predetermined operating pressure, said joint and its seal receiving cavity being displaceable from said predetermined sealing position when said predetermined operating pressure is exceeded, and passage means extending from each cavity to the exterior of said pressure tank when said sections are displaced from said predetermined sealing position.

5. A pressure relief seal for pressure tanks according to claim 4, wherein said passage means comprises a plurality of notches and wherein said O-ring sealingly isolates said notches from said pressure chamber in said predetermined sealing position.

6. A pressure relief seal for pressure tanks according to claim 4, wherein said separable container sections are mechanically coupled together by a circumferential clamping band which encircles said flange portion.

* * * * *